(12) United States Patent
Buchanan, Jr.

(10) Patent No.: US 6,615,654 B2
(45) Date of Patent: Sep. 9, 2003

(54) MOISTURE SENSOR HAVING ACCELERATED MOISTURE FORMATION MEANS

(75) Inventor: Harry Charles Buchanan, Jr., Dayton, OH (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 0 days.

(21) Appl. No.: 09/750,545

(22) Filed: Dec. 28, 2000

(65) Prior Publication Data

US 2002/0083765 A1 Jul. 4, 2002

(51) Int. Cl.$^7$ ................................................ G01W 1/00
(52) U.S. Cl. .................................................. 73/170.17
(58) Field of Search ......................... 73/170.16, 170.17, 73/170.18, 170.19, 170.21, 170.22, 170.23, 335.01, 335.02, 335.04, 335.05; 318/443, 444

(56) References Cited

U.S. PATENT DOCUMENTS

| 4,639,831 | A |   | 1/1987  | Iyoda                |
|-----------|---|---|---------|----------------------|
| 4,703,237 | A |   | 10/1987 | Hochstein            |
| 4,827,198 | A |   | 5/1989  | Mueller et al.       |
| 5,668,478 | A | * | 9/1997  | Buschur ...... 324/690 |
| 5,900,821 | A | * | 5/1999  | Petzold ...... 318/444 |
| 6,094,981 | A | * | 8/2000  | Hochstein ...... 73/170.17 |

* cited by examiner

*Primary Examiner*—Benjamin R. Fuller
*Assistant Examiner*—Corey D. Mack
(74) *Attorney, Agent, or Firm*—J. Gordon Lewis

(57) ABSTRACT

A moisture sensing device for detecting moisture on a moisture collecting surface including an air pump for accelerating the formation of moisture on the moisture collecting surface. The moisture sensing device includes a moisture sensor that is operably positionable relative to a moisture collecting surface. The device also includes an air pump for accelerating the formation of moisture on the moisture collecting surface. A small pump can direct a flow of air over the moisture collecting surface to accelerate the formation of moisture through condensation.

26 Claims, 1 Drawing Sheet

US 6,615,654 B2

MOISTURE SENSOR HAVING ACCELERATED MOISTURE FORMATION MEANS

FIELD OF THE INVENTION

The invention relates to a rain sensor for a windshield of a vehicle, and more specifically, the invention provides a rain sensor and a small air pump for directing a flow of air with respect to a surface sensed by the sensor.

BACKGROUND OF THE INVENTION

When an automobile driver travels long distances through rain, the driver must continually adjust the speed of the windshield wipers because the intensity of the rain striking the windshield continually varies. Variation is caused by the natural variation in rain over time and distance, and also by man-made agents, such as passing vehicles which shower the windshield with spray.

This continual adjustment can be tedious. Rain sensors have been developed in order to automate the control of windshield wipers. These sensors generally take the form of conductive sensors capacitive sensors, or optical sensors. In all types of sensors, however, the sensing of moisture is passive in that a moisture collecting surface is simply exposed to the environment. Typically, the moisture collecting surface is the windshield of the vehicle. It would be desirable to manipulate the moisture collecting surface to promote the formation of moisture in proximity to the surface sensed by the sensor before moisture actually collects on the remaining portions of the surface.

SUMMARY OF THE INVENTION

The present invention provides an apparatus for actively detecting the presence of moisture on a moisture collecting surface. The apparatus includes a moisture sensor that can detect the presence of moisture on a moisture collecting surface. The moisture sensor can be a conductive moisture sensor, an optic moisture sensor, or a capacitive moisture sensor. The moisture collecting surface can be defined by at least a portion of the windshield of a vehicle. The apparatus also includes means for accelerating the formation of moisture on the moisture collecting surface adjacent to or in proximity to the portion of the surface sensed by the sensor. The means for accelerating moisture formation can be an air pump capable of directing a flow of air with respect to the moisture collecting surface. The air pump can include means for cooling the air to be directed over the moisture collecting surface. The air pump can be formed of a flexible housing having an inlet port and an outlet port and valves to control the flow of air in and out of the ports. An air pump with a flexible housing can be expanded and contracted, similar to a bellows, to draw air into the housing and discharge air out of the housing by a pulsatable member, such as a piezoelectric member. In such an embodiment, the apparatus can include means for alternating the voltage across the piezoelectric member. Accelerating the formation of moisture on the collecting surface can also be accomplished by any means capable of reducing the temperature of the collecting surface to promote condensation. The apparatus can also include a controller for controlling the operation of the air pump or cooling means.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
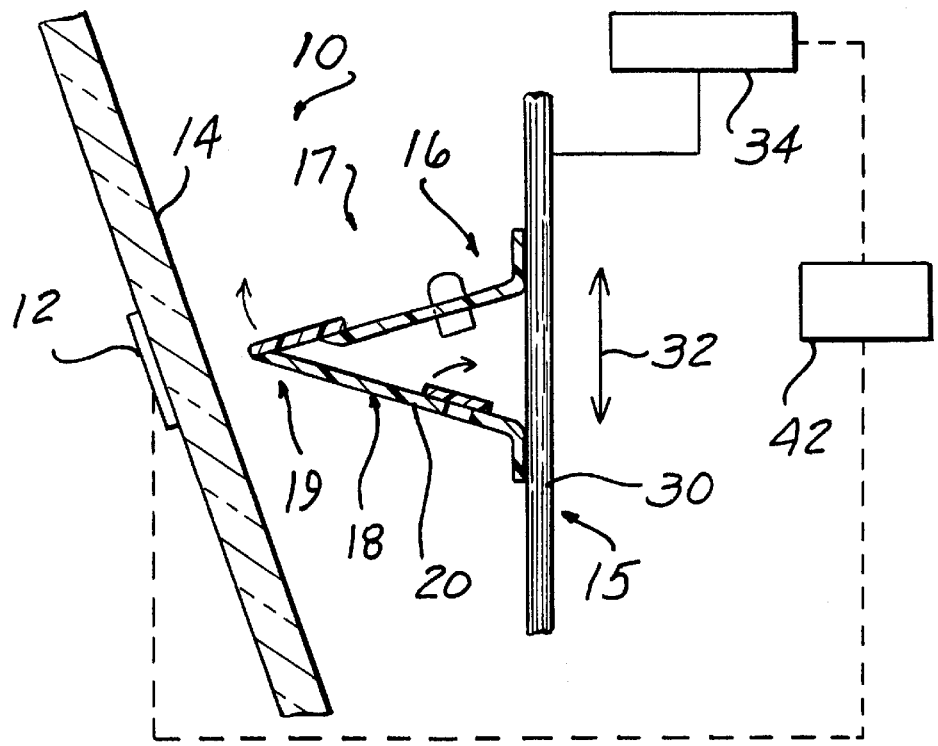
FIG. 1 is a cross sectional side view of an embodiment of the present invention wherein an air pump is positioned adjacent to a windshield of a vehicle.

The present invention provides a moisture detector for actively promoting condensation in a predefined location. The detector 10 includes a moisture sensor 12 operably positionable with respect to a moisture collection surface 14. The moisture sensor 12 can be positioned spaced apart from the surface 14, or mounted directly to the surface 14, or incorporated with the surface 14 as part of the sensor 12. For example, in a capacitive rain sensor as used on the windshield of a vehicle, the sensor can be positioned adjacent an interior surface of the windshield, and is operably positioned with respect to the exterior surface of the windshield defining the moisture collecting surface. In such an embodiment of a moisture sensor, the windshield physically separates the moisture sensor 12 and the moisture collecting surface 14. In a conductive or resistive rain sensor, a pair of parallel conductors extend from the sensor and are positioned on the moisture collecting surface. The detector 10 can include one or more sensors selected from a group of sensors including a capacitive sensor, a resistive sensor, a conductive sensor, and an optical sensor.

The active moisture detector 10 of the present invention also includes means 15 for accelerating the formation of moisture on the collecting surface 14. The accelerating means 15 can include means operable for reducing the temperature of the collecting surface 14 to otherwise accelerate the formation of moisture through condensation. The acceleration means 15 can also include means 19 for directing a flow of air over the collecting surface. By directing a flow of air over the collecting surface, the active moisture detector 10 takes advantage of wind chill effects. Wind chill is the rate of heat loss caused by air motion. Specifically, it is the rate of units of heat carried away from a body by wind. For example, at a temperature of 0° F. and a wind speed of 30 mph, the heat loss is equivalent to −49° F. By directing a flow of air over the moisture collecting surface 14, the active moisture detector 10 can increase the rate of heat loss experienced by the moisture collecting surface 14. As heat is lost by the moisture collecting surface 14, the likelihood of condensation first occurring on the moisture collecting surface 14 in proximity to or adjacent the sensor prior to collecting on other portions of the surface is increased.

Figure 2A:
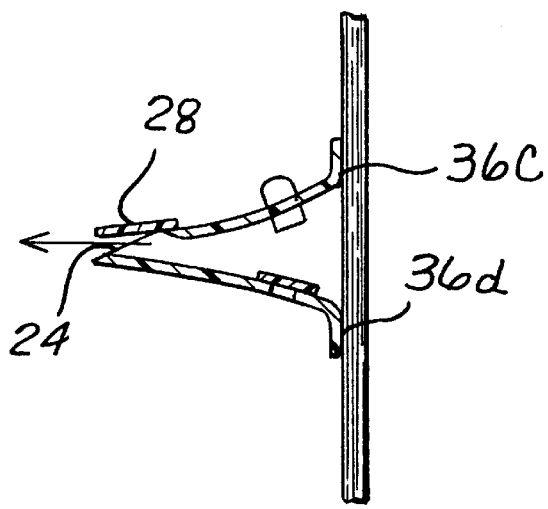
FIG. 2a is a cross sectional side view of an air pump according to the present invention expelling air with respect to a position of the windshield in proximity to the sensor.
Figure 2B:
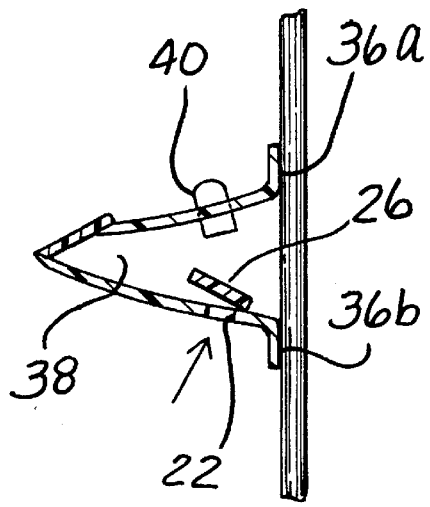
FIG. 2b is a cross sectional side view of an air pump according to the present invention drawing air into the flexible housing or bellows.

The air flow directing means 19 can be a pump or blower 16. The pump 16 can include a housing or bellows 18 defined by at least one wall 20. The housing 18 can be formed in the shape of a cone or a wedge. The wall 20 can be formed of a flexible material such as rubber or plastic. The housing 18 can include an inlet port 22 as shown in FIG. 2b, and an outlet port 24 as shown in FIG. 2a. Valves 26 and 28 respectively, can be operable to selectively open and close the inlet port 22 and outlet port 24 in response to expansion and contraction of the housing or bellows 18. The wall 20 of the housing 18 can be joined to a drive member 30, as shown in FIG. 1. The drive member 30 can be reciprocable or pulsatable to operably increase and decrease in the direction indicated by the arrow 32 shown in FIG. 1 for driving the flexible housing or bellows 18 to pump air out of the outlet port 24 to be directed across the moisture collecting surface 14. The drive member 30 can be a piezoelectric member. The pump 16 can include a voltage alternator 34. The voltage alternator 34 can apply positive and negative voltage across the peizoelectric member 30 to bring about changes in dimension of the drive member 30.

During the operation of the pump 16, the voltage alternator 34 applies alternating positive and negative voltages across the piezoelectric member 30 causing the piezoelectric member 30 to increase and decrease in dimension. The wall 20 of the housing 18 can be connected to the piezoelectric member 30 at positions 36a and 36b as shown in FIG. 2b. When the piezoelectric member 30 increases in dimension, the housing 18 is stretched as the base positions 36a and 36b become further apart. The expansion of the housing 18 results in a negative pressure differential between an internal cavity 38 of the housing 18 and the ambient air. The pressure differential causes the flap valve 26 to open and allow air into the housing 18 through the inlet port 22. When the voltage is reversed, the piezoelectric member 30 decreases in dimension. The base positions 36c and 36d, as shown in FIG. 2a, can move towards each other as the housing 18 contracts. The contraction of the housing 18 creates a positive pressure differential between the internal cavity 38a of the housing 18 and the ambient air. The flap valve 28 opens and air is driven out of the housing 18 through the outlet port 24. In this embodiment of the invention, the pump 16 acts as a bellows.

The pump 16 can also include a heat exchanger 40. The heat exchanger 40 can be positioned in the wall 20 of the housing 18. The heat exchanger 40 can act on the air in the internal cavity 38 to heat or cool the air. The heat exchanger 40 can be powered by an electric power source.

The active moisture detector 10 can also include control means 42 for controlling the operation of the voltage alternator 34. The control means 42 can receive a signal from the moisture sensor 12 indicating that the moisture sensor 12 has sensed the presence of moisture on the moisture collecting surface 14. The control means 42 can then stop the operation of the voltage alternator 34 and thereby stop the operation of the pump 16. Generally, for a moisture sensor for a windshield of a vehicle, once moisture has been detected on the exterior surface of the windshield, the windshield wipers are activated to remove the moisture. During the wiping operation, pump 16 can be disengaged.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for promoting early detection of moisture on a moisture collection surface comprising:
   a moisture sensor operably positionable with respect to the moisture collection surface defined by a windshield of a vehicle; and
   means for accelerating formation of moisture on the collection surface in proximity with the moisture sensor, the accelerating means positioned with respect to the moisture collection surface to interpose the moisture collection surface in between the accelerating means and the moisture sensor.

2. The apparatus of claim 1 wherein the accelerating means further comprises:
   means for reducing a temperature of the collection surface.

3. The apparatus of claim 1 further comprising:
   control means for controlling operation of the accelerating means in response to moisture being detected.

4. An apparatus for promoting early detection of moisture on a moisture collection surface comprising:
   a moisture sensor operably positionable with respect to the moisture collection surface; and
   means for accelerating formation of moisture on the collection surface in proximity with the moisture sensor, the accelerating means positioned with respect to the moisture collection surface to interpose the moisture collection surface in between the accelerating means and the moisture sensor, wherein the accelerating means includes means for directing a flow of air over the collection surface.

5. The apparatus of claim 4 further comprising:
   means for cooling the air directed over the collection surface.

6. An apparatus for promoting early detection of moisture on a moisture collection surface comprising:
   a moisture sensor operably positionable with respect to the moisture collection surface;
   means for accelerating formation of moisture on the collection surface in proximity with the moisture sensor, the accelerating means positioned with respect to the moisture collection surface to interpose the moisture collection surface in between the accelerating means and the moisture sensor; and
   means for controlling operation of the accelerating means.

7. An apparatus for promoting early detection of moisture on a moisture collection surface comprising:
   a rain sensor operably positionable with respect to the moisture collection surface, wherein the moisture collection surface is defined by a windshield of a vehicle; and
   means, spaced from the rain sensor and operable independently of an interior passenger compartment climate control system, for accelerating formation of moisture on the collection surface in proximity with the rain sensor.

8. The apparatus of claim 7 wherein the accelerating means further comprises:
   means for reducing a temperature of the collection surface.

9. The apparatus of claim 7 further comprising:
   control means for controlling operation of the accelerating means in response to moisture being detected.

10. An apparatus for promoting early detection of moisture on a moisture collection surface comprising:
    a rain sensor operably positionable with respect to the moisture collection surface, wherein the moisture collection surface is defined by a windshield of a vehicle; and means, spaced from the rain sensor and operable independently of an interior passenger compartment climate control system, for accelerating formation of moisture on the collection surface in proximity with the rain sensor, wherein the accelerating means includes means for directing a flow of air over the collection surface.

11. The apparatus of claim 10 wherein the directing means further comprises:
a flexible housing having at least one wall, an inlet port and an outlet port; and
means for driving air flow through the housing.

12. An apparatus for promoting early detection of moisture on a moisture collection surface comprising:
a rain sensor operably positionable with respect to the moisture collection surface, wherein the moisture collection surface is defined by a windshield of a vehicle; and
means, spaced from the rain sensor, for accelerating formation of moisture on the collection surface in proximity with the rain sensor, wherein the accelerating means includes means for directing a flow of air over the collection surface, wherein the directing means includes a flexible housing having at least one wall, an inlet port and an outlet port, means for driving air flow through the housing, a first valve for closing the inlet port when air is driven out of the housing, and a second valve for closing the outlet port when air is drawn into the housing.

13. The apparatus of claim 12 wherein the driving means further comprises:
a pulsatable member, operably associated with the at least one wall of the housing to expand and contract the flexible housing.

14. The apparatus of claim 13 wherein the pulsatable member further comprises:
a piezoelectric member; and
means for alternating voltage across the piezoelectric member.

15. An apparatus for promoting early detection of moisture on a moisture collection surface comprising:
a rain sensor operably positionable with respect to the moisture collection surface, wherein the moisture collection surface is defined by a windshield of a vehicle;
means, spaced from the rain sensor, for accelerating formation of moisture on the collection surface in proximity with the rain sensor, wherein the accelerating means includes means for directing a flow of air over the collection surface; and
means for cooling the air directed over the collection surface.

16. An apparatus for promoting early detection of moisture on a moisture collection surface comprising:
a rain sensor operably positionable with respect to the moisture collection surface, wherein the moisture collection surface is defined by a windshield of a vehicle, wherein the rain sensor includes at least one pair of parallel conductors, and means for measuring electrical capacitance between the conductors; and
means, spaced from the rain sensor and operable independently of an interior passenger compartment climate control system, for accelerating formation of moisture on the collection surface in proximity with the rain sensor.

17. An apparatus for promoting early detection of moisture on a moisture collection surface comprising:
a rain sensor operably positionable with respect to the moisture collection surface, wherein the moisture collection surface is defined by a windshield of a vehicle, wherein the rain sensor includes at least one pair of parallel conductors, and means for measuring the electrical resistance between the conductors; and
means, spaced from the rain sensor and operable independently of an interior passenger compartment climate control system, for accelerating formation of moisture on the collection surface in proximity with the rain sensor.

18. An apparatus for promoting early detection of moisture on a moisture collection surface comprising:
a rain sensor operably positionable with respect to the moisture collection surface, wherein the moisture collection surface is defined by a windshield of a vehicle;
means, spaced from the rain sensor, for accelerating formation of moisture on the collection surface in proximity with the rain sensor; and
control means for controlling operation of the accelerating means when moisture has been detected.

19. A method for promoting early detection of moisture on a moisture collection surface comprising the steps of:
operably positioning a moisture sensor with respect to the moisture collection surface defined by a windshield of a vehicle; and
accelerating formation of moisture on the collection surface in proximity with the moisture sensor, with means for accelerating positioned spaced with respect to the moisture sensor to interpose the collection surface therebetween.

20. The method of claim 19 wherein the positioning step further comprises the step of:
mounting a rain sensor with respect to the collection surface defined by a windshield of a vehicle.

21. The method of claim 20 wherein the accelerating step further comprises the step of:
reducing a temperature of the collection surface.

22. A method for promoting early detection of moisture on a moisture collection surface comprising the steps of:
operably positioning a moisture sensor with respect to the moisture collection surface;
accelerating formation of moisture on the collection surface in proximity with the moisture sensor, with means for accelerating positioned spaced with respect to the moisture sensor to interpose the collection surface therebetween; and
cooling an air flow directed over the collection surface.

23. The method of claim 19 further comprising the step of:
controlling operation of the accelerating means in response to moisture being detected.

24. A method for promoting early detection of moisture on a moisture collection surface comprising the steps of:
operably positioning a moisture sensor with respect to the moisture collection surface, wherein the positioning step includes the step of mounting a rain sensor with respect to the collection surface defined by a windshield of a vehicle; and
accelerating formation of moisture on the collection surface in proximity with the moisture sensor, with means for accelerating positioned spaced with respect to the moisture sensor to interpose the collection surface therebetween, wherein the accelerating step includes the step of directing a flow of air over the collection surface.

25. An apparatus for promoting early detection of moisture on a moisture collection surface comprising:
   a moisture sensor operably positionable with respect to the moisture collection surface;
   means for accelerating formation of moisture on the collection surface in proximity with the moisture sensor, the accelerating means positioned with respect to the moisture collection surface to interpose the moisture collection surface in between the accelerating means and the moisture sensor; and
   means for cooling an air flow directed over the collection surface.

26. An apparatus for promoting early detection of moisture on a moisture collection surface comprising:
   a rain sensor operably positionable with respect to the moisture collection surface, wherein the moisture collection surface is defined by a windshield of a vehicle; and
   means, spaced from the rain sensor and operable independently of an interior passenger compartment climate control system, for accelerating formation of moisture on the collection surface in proximity with the rain sensor; and
   means for cooling an air flow directed over the collection surface.

* * * * *